(12) United States Patent
Moon

(10) Patent No.: US 7,556,581 B2
(45) Date of Patent: Jul. 7, 2009

(54) TRANSMISSION HAVING INTEGRATED BRAKING DEVICE

(75) Inventor: Hyoung Woo Moon, Jinju (KR)

(73) Assignee: SE IL Industry Co., Ltd., Gyeongsangnam-do (KR)

( * ) Notice: Subject to any disclaimer, the term of this patent is extended or adjusted under 35 U.S.C. 154(b) by 408 days.

(21) Appl. No.: 11/459,532

(22) Filed: Jul. 24, 2006

(65) Prior Publication Data

US 2007/0219043 A1 Sep. 20, 2007

(30) Foreign Application Priority Data

Mar. 14, 2006 (KR) .................... 10-2006-0023705

(51) Int. Cl.
*F16H 57/04* (2006.01)
(52) U.S. Cl. ..................................... 475/160; 475/311
(58) Field of Classification Search ................. 475/159, 475/160, 311, 331
See application file for complete search history.

(56) References Cited

U.S. PATENT DOCUMENTS 2,584,454 A * 2/1952 Howard ....................... 188/382
3,137,180 A * 6/1964 Dragonuk ..................... 475/16
3,263,946 A * 8/1966 Roberts et al. .............. 244/213

FOREIGN PATENT DOCUMENTS

JP 06264978 A * 9/1994

* cited by examiner

*Primary Examiner*—Ha D. Ho
(74) *Attorney, Agent, or Firm*—Sherr & Vaughn, PLLC

(57) ABSTRACT

Disclosed is a transmission, which makes it possible to conduct work of repairing or replacing a braking device by disassembling only parts of a reduction gear system after separating a housing, and in which oil is provided around the braking device and circulates along a flow path, thus preventing the braking device from wearing, thereby extending the lifetime of bearings and gears. The housing is separable at a point between a driven gear and a planetary gear assembly.

7 Claims, 4 Drawing Sheets

TRANSMISSION HAVING INTEGRATED BRAKING DEVICE

CROSS-REFERENCED APPLICATIONS

The present application claims priority under 35 U.S.C. 119 and 35 U.S.C. 365 to Korean Patent Application No. 10-2006-0023705 (filed on Mar. 14, 2006), which is hereby incorporated by reference in its entirety.

BACKGROUND OF THE INVENTION

1. Field of the Invention

The present invention relates generally to transmissions which are used in industrial vehicles, such as tractors and forklifts, or in motorized machines, to transmit power to drive wheels and, more particularly, to a transmission, in which an electric or hydraulic motor provided to each drive wheel is coupled to a drive means through a power transmission system having a braking device combined with a planetary gear assembly.

2. Description of the Related Art

Generally, industrial vehicles such as forklifts use a braking device (for example, a disk brake), which is integrated with each power transmission reduction gear system (for example, a planetary gear assembly), in place of using an individual brake integrated with each wheel. In this case, the manufacturing costs are markedly reduced, and the construction of the entire drive/braking system is simplified.

However, in the conventional techniques having the above-mentioned construction, in the case that the braking device is combined with the power transmission reduction gear system, when maintenance or repair work, such as work for repairing an oil lubrication disk of the braking device, is required, it is difficult to disassemble the braking device, because the entire power transmission reduction gear system must be disassembled to access the braking device.

Meanwhile, a representative transmission, which overcomes the above-mentioned problem, in which the entire power transmission reduction gear system must be disassembled in order to access the braking device, was proposed in Europe Patent No. EP 0919416 B1. This transmission will be explained herein below.

The transmission T is coupled at an end thereof to a drive shaft 2 of a drive motor M and coupled at the opposite end thereof to a drive means, such as a wheel or a rotating member R. The transmission T has a structure such that a power transmission path is configured in a "Z" shape through a drive pinion 31. The drive pinion 31 is keyed to the drive shaft 2 of the drive motor M on a drive axis line (X-X).

The drive pinion 31 engages with a driven wheel 32, and a driven shaft 321 is coupled to the center of the driven wheel 32. The driven shaft 321 is disposed on a driven axis line (Y-Y) parallel to the drive axis line (X-X). A first end of the driven shaft 321 is coupled to a fastening member 326 for holding the drive means R. A planetary gear assembly (323 and 325) is coupled to the driven shaft 321 at a predetermined position between the driven wheel 32 and the fastening member 326. The driven shaft 321 is coaxially coupled at a second end thereof to a braking device DF. The braking device DF is placed in a separate chamber attached to the transmission T. The chamber has an opening and an access cover 131. The opening and the access cover 131 are disposed at positions adjacent to the drive motor, that is, at positions opposite the drive means.

In the transmission having the above-mentioned construction, work of modulating or repairing the braking device can be easily conducted by opening the access cover without disassembling the entire power transmission reduction gear system.

However, in the case of this transmission, because the opening and the access cover are disposed opposite the drive means, when it is necessary to disassemble the reduction gear system, parts of the transmission from the drive means to the power transmission part (the drive motor) must be disassembled.

Furthermore, this conventional transmission is problematic in that, due to wear of brake disks of the braking device, the oil for the reduction gear system is deteriorated and the lifetime of the bearings and gears is reduced.

SUMMARY OF THE INVENTION

Accordingly, the present invention has been made keeping in mind the above problems occurring in the prior art, and an object of the present invention is to provide a transmission which makes it possible to conduct the work of repairing or replacing a braking device by disassembling only parts of a reduction gear system after separating a housing, without disassembling the entire transmission, ranging from a drive means to a power transmission part (a drive motor), and in which oil is provided around the braking device and circulates along a flow path, thus preventing the braking device from wearing, thereby extending the lifetime of bearings and gears.

In order to accomplish the above object, the present invention provides a transmission having a braking device integrated with a reduction gear power transmission system, in which a drive motor is provided on a first end of a housing and drive means is provided on an opposite second end of the housing. The transmission includes an output shaft provided at a predetermined position in the housing to receive power from the drive motor; a drive shaft coaxially coupled to the output shaft; a drive gear provided at a predetermined position on the drive shaft; a driven gear engaging with the drive gear; a driven shaft coaxially coupled to the driven gear and being parallel to the drive shaft, so that power is transmitted from the drive shaft to the drive means through the driven shaft; the braking device coaxially coupled to an outer surface of a portion of the driven gear that faces the drive motor; and a planetary gear assembly provided on an outer surface of the driven shaft at a position adjacent to the drive means to transmit the power at reduced speed. The housing is separable at a point between the driven gear and the planetary gear assembly.

The transmission may further include a needle bearing and a needle roller bearing provided on each of opposite ends of the driven shaft.

The transmission may further include a ring gear engaging with the planetary gear assembly outside a radius of rotation of the planetary gear assembly and integrally coupled at a predetermined position to an inner surface of the housing.

The transmission may further include a coupler and a parking pin coupled to the braking device at a position adjacent to the drive motor; and a parking lever coupled to the parking pin at a position adjacent to the drive motor and hinged at an end thereof to the first end of the housing.

Furthermore, a space for receiving the driven gear may communicate with a space for receiving the braking device in the housing, a through hole may be longitudinally formed through the driven shaft, and oil passing holes may be formed in the housing around respective opposite ends of the driven and are connected to the receiving space for the braking device, thereby an oil flow path is defined.

Moreover, an oil groove, which communicates with the driven gear receiving space, may be formed at a medial position in the outer surface of the driven shaft.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

Figure 1:
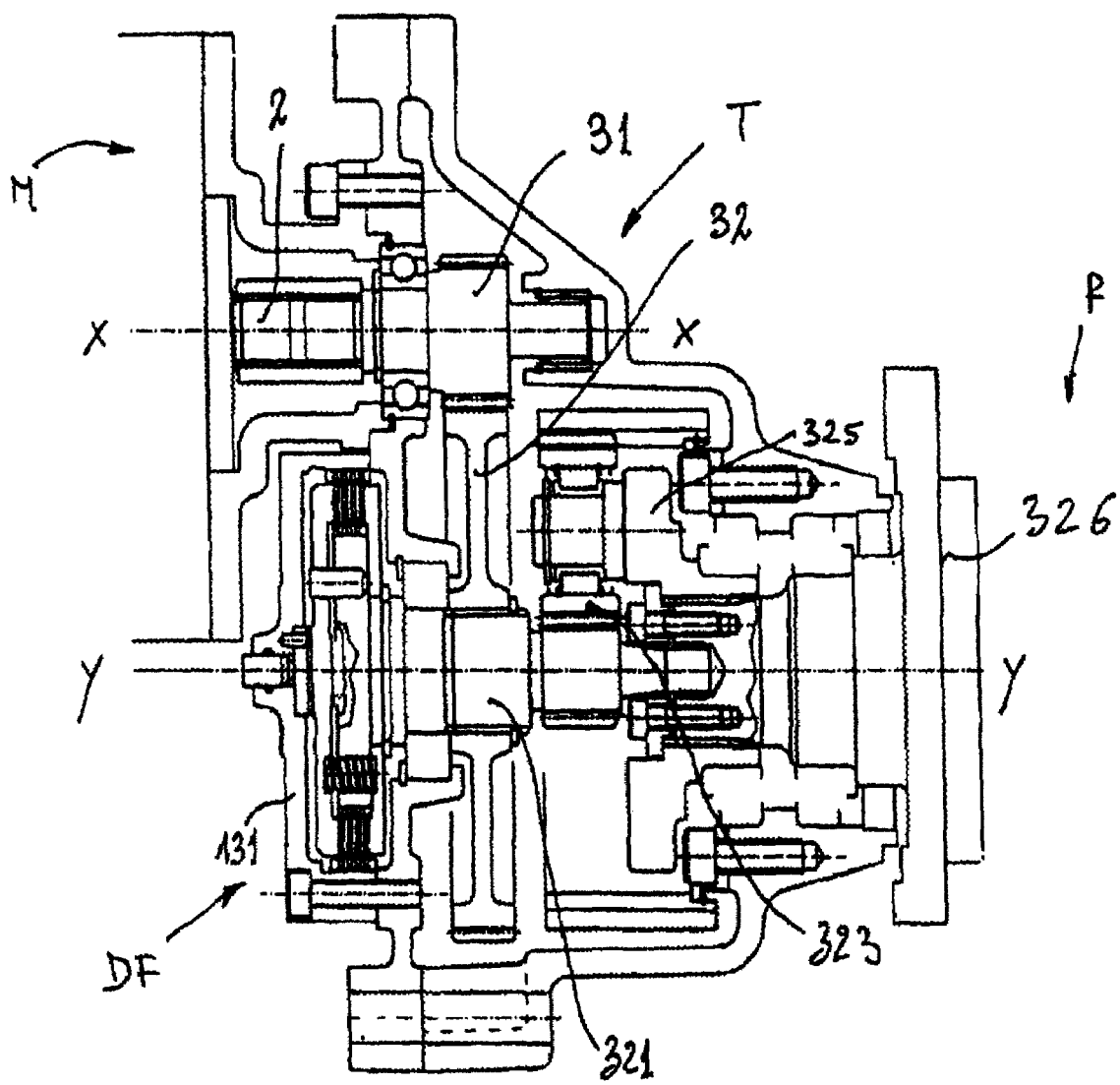
FIG. 1 is a sectional view showing the construction of a conventional transmission having an integrated braking device.
Figure 2:
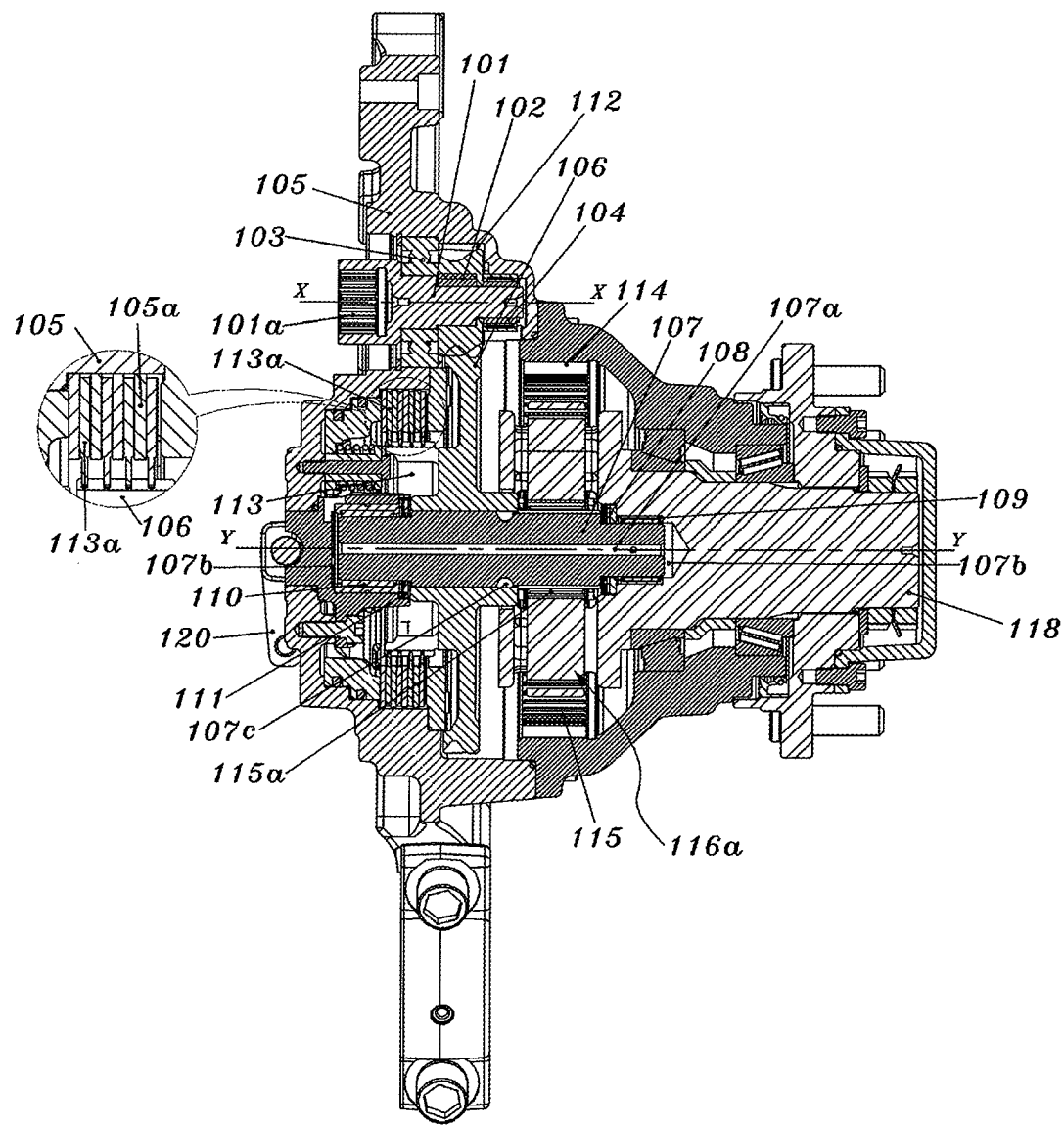
FIG. 2 is a horizontal sectional view showing the construction of a transmission having an integrated braking device, centered on a driven shaft, according to an embodiment of the present invention.

FIG. 2 is a horizontal sectional view showing the construction of a transmission having an integrated braking device, centered on a driven shaft 107, according to the embodiment of the present invention.

As shown in FIG. 2, the transmission according to the embodiment of the present invention has a structure such that a reduction gear power transmission system and the braking device are integrated with each other. Power of an output shaft 101a coupled to the drive motor (not shown) is transmitted to a drive means 118 of a wheel through a drive shaft 101 and the driven shaft 107.

The output shaft 101a is mounted at a predetermined position to a housing 105 and receives power from the drive motor, such that the power is transmitted from the drive motor to the interior of the housing 105. The output shaft 101a is coupled to the rotating shaft of the drive motor, and the drive shaft 101 is coaxially coupled to the output shaft 101a, so that the drive shaft 101 is rotated in conjunction with the rotating shaft of the drive motor through the output shaft 101a. The common central axis of the output shaft 101a and the drive shaft 101 will be referred to as the drive axis line (hereinafter, referred to simply as an X-X axis). Bearings 103 and 104 are provided on the outer surface of the drive shaft 101 at a position adjacent to a first end thereof and at a second end thereof, respectively.

Furthermore, a drive gear 102 is provided at a predetermined position on the outer surface of the drive shaft 101. The drive gear 102 engages with a driven gear 106. The driven shaft 107 is provided on the center of the driven gear 106, so that power of the drive shaft 101 is transmitted to the drive means through the driven shaft 107. The central axis of the driven shaft 107 is placed on a driven axis line (hereinafter, referred to simply as a Y-Y axis) and is parallel with the drive axis line (the X-X axis).

Meanwhile, the braking device 113a is coaxially provided around a portion of the driven gear 106 which is adjacent to the drive motor and has a diameter less than that of a portion on which the gear teeth thereof are formed.

The braking device 113a includes a plurality of brake disks. Furthermore, a plurality of brake pads 105a is provided on the outer surface of the portion of the driven gear 106 which has a diameter smaller than that of the portion on which the gear teeth thereof are formed. The brake disks are alternately disposed between the brake pads 105a and are coupled to the interior of the housing 105. When the brake disks are pressed, the driven gear is braked by frictional force applied to the brake pads 105a.

Meanwhile, a planetary gear assembly 116a for power transmission is provided on the outer surface of the driven shaft 107 at a position adjacent to the drive means. The planetary gear assembly 116a includes a sun gear 115a, which is fastened to the circumferential outer surface of the driven shaft 107, and a planetary gear 115, which is provided around the sun gear 115a and engages with the sun gear 115a. A planetary gear carrier, which revolves along with the planetary gear 115, is coupled to the central portion of the planetary gear 115. A ring gear 114, which is disposed outside the planetary gear 115, radially engages with the planetary gear 115. The ring gear 114 is integrally coupled to the inner surface of the housing 105.

In the present invention, the housing 105 can be removed from between the driven gear 106 and the planetary gear assembly 116a, thus making it easy to access the braking device for repair or replacement of the braking device.

Each needle bearing 108, 111 and each needle roller bearing 109, 110 are provided on each of the opposite ends of the driven shaft 107. The needle bearings 108 and 111 support load in the direction of the Y-Y axis, and the needle roller bearings 109 and 110 support load in a direction perpendicular to the Y-Y axis. Here, if typical bearings are provided on the opposite ends of the driven shaft 107, because it is difficult to disassemble the reduction gear system, inspection or repair of the braking device is not easy. To avoid this, in the present invention, the needle bearings 108 and 111 and the needle roller bearings 109 and 110 are provided on the opposite ends of the driven shaft 107, so that the reduction gear system can be easily disassembled. The needle bearings 108 and 111 and the needle roller bearings 109 and 110 can be easily coupled to the opposite ends of the driven shaft 107 in the direction of the Y-Y axis. It is preferable that a thrust needle bearing be used as each needle bearing.

Figure 3:
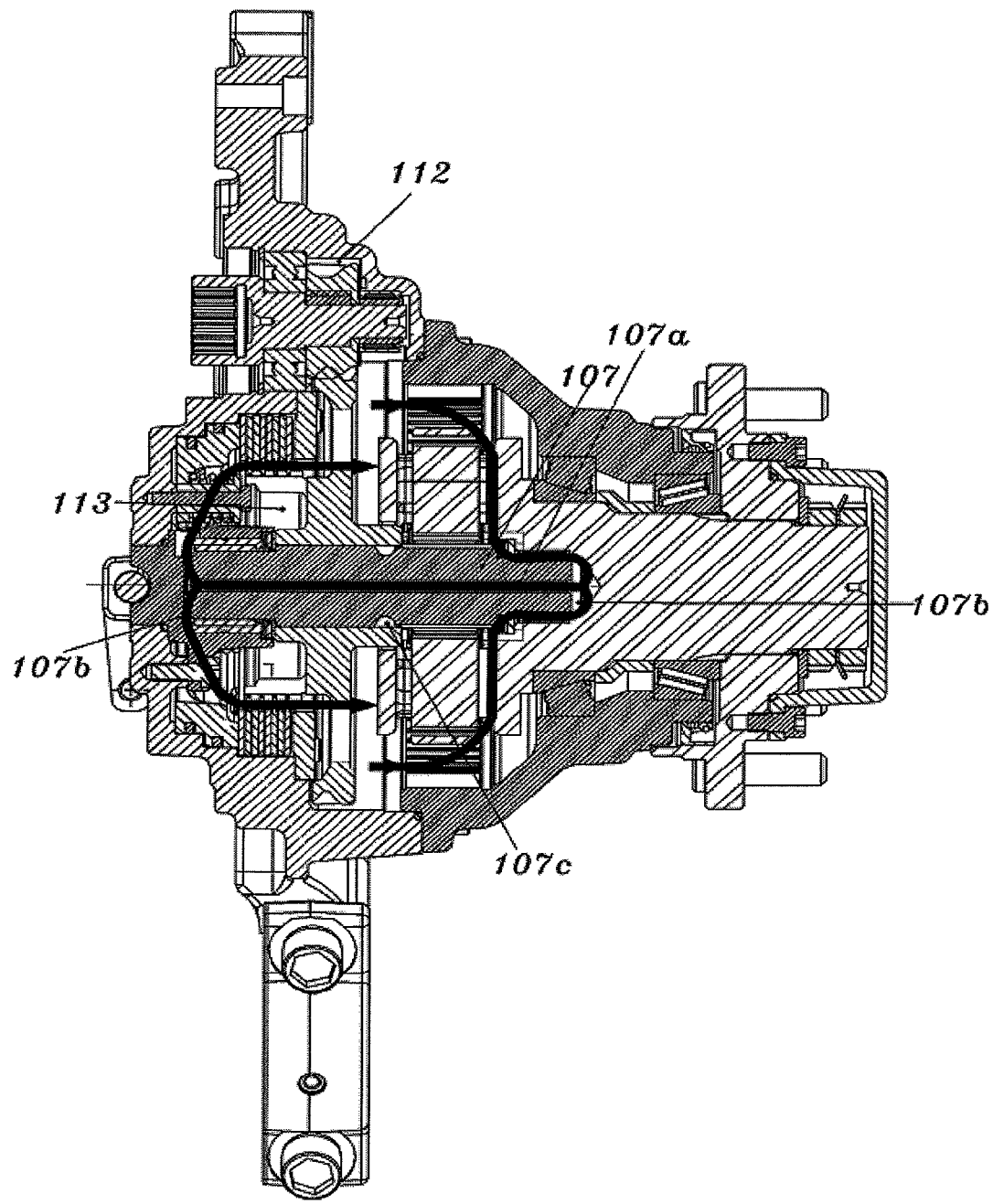
FIG. 3 is a sectional view of the transmission of FIG. 2 to show the flow path of oil.

FIG. 3 is a sectional view of the transmission of the present invention to show the flow path of oil.

As shown in FIG. 3, in the housing 105 of the transmission, a receiving space 112 required for the driven gear 106 communicates with a receiving space 113 required for the braking device, a through hole 107a is formed along the longitudinal axis of the driven shaft 107, and oil passing holes 107b, which communicate with the braking device receiving space 113, are formed around the opposite ends of the driven shaft 107. Thereby, an oil path (designated by the thick line of FIG. 3) is defined. Furthermore, an oil groove 107c is formed at a medial position in the outer surface of the driven shaft 107. The oil groove 107c communicates with the driven gear receiving space 112, so that oil provided in the driven gear receiving space 112 is evenly dispersed onto the outer surface of the driven shaft 107.

Oil provided in the driven gear receiving space 112 flows to the planetary gear assembly 116a due to rotation of the driven shaft 107 and, thereafter, flows towards the end of the driven shaft 107 that is adjacent to the drive means.

The rotating operation related to the driven shaft 107 will be presented below. The drive shaft 101 and the drive gear 102 are rotated by rotation of the drive motor. The driven gear 106 and the driven shaft 107 are rotated by rotation of the drive gear 102. The planetary gear assembly 116a and the drive means are rotated by rotation of the driven shaft 107. As a result, the wheel is driven along with the drive means.

When the driven shaft 107 is rotated in the direction that moves the vehicle forwards, oil is spirally moved towards the drive means by centrifugal force applied thereto. That is, the oil is moved to the end of the driven shaft 107, which is adjacent to the drive means, along the oil passing hole 107b of the driven shaft 107 through the interior of the planetary gear assembly 116a. Because oil, which has been charged in the driven gear receiving space 112, is continuously moved towards the end of the driven shaft 107 which is adjacent to the drive means, oil, which has moved to the drive means side end of the driven shaft 107, is pushed by the oil behind it and, thus, is moved into the through hole 107a of the driven shaft 107. The oil, having been pushed into the through hole 107a, is moved to the oil passing hole 107b, which is formed around the end of the driven shaft 107, which is adjacent to the drive motor. The oil, having reached the drive motor side end of the driven shaft 107, is spirally moved into the braking device receiving space 113 by centrifugal force generated by the rotation of the driven shaft 107. The oil, having entered the braking device receiving space 113, is again moved to the driven gear receiving space 112. The above-described oil circulation is repeatedly conducted.

Figure 4:
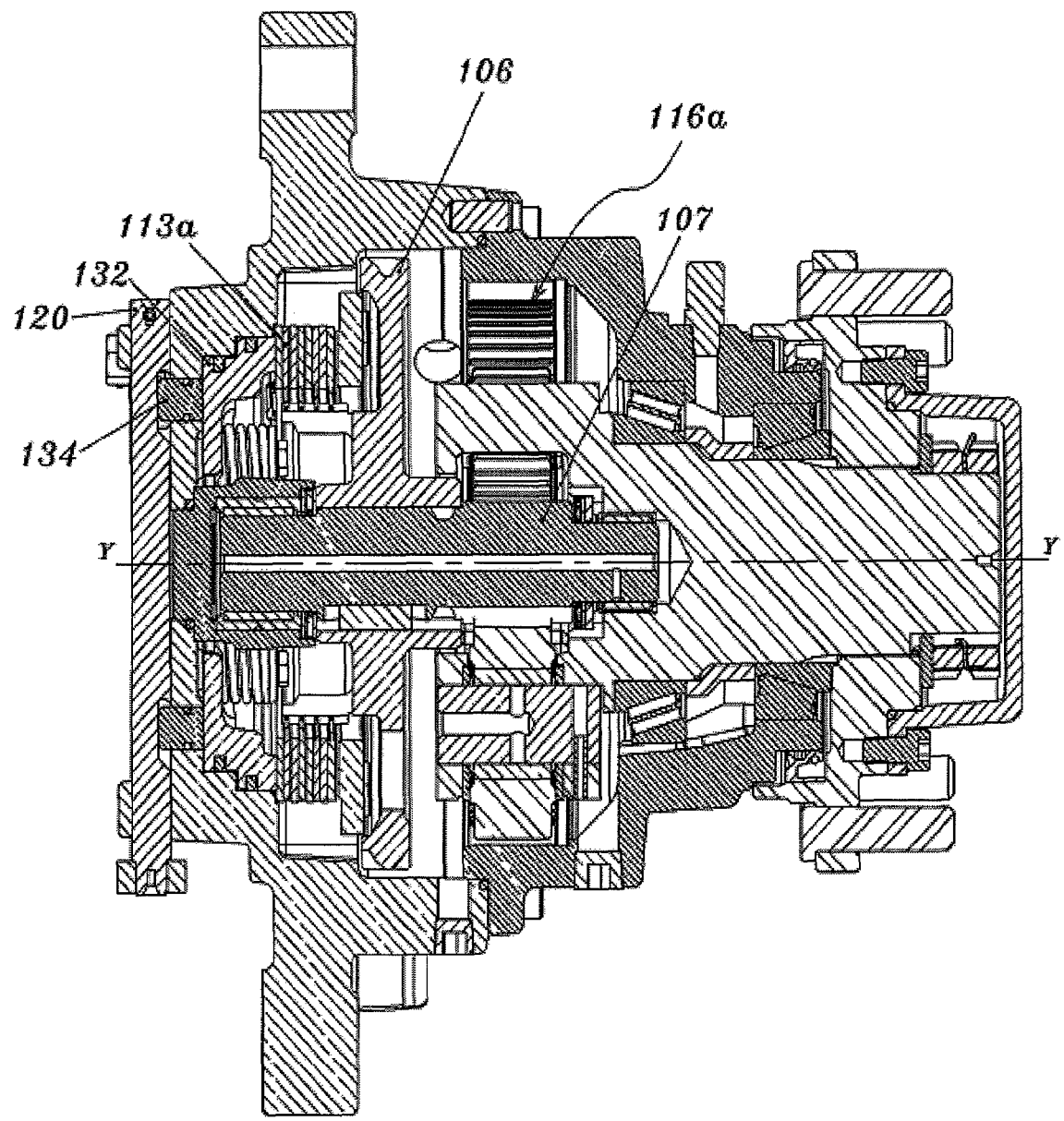
FIG. 4 is a vertical sectional view showing the construction of a transmission having the integrated braking device, centered on the driven shaft, according to an embodiment of the present invention.

FIG. 4 is a vertical sectional view showing the construction of the transmission of the present invention, centered on the driven shaft 107.

As shown in FIG. 4, in the braking device, a coupler 132 is provided at a position adjacent to the drive motor. A parking pin 134 is coupled to the side of the coupler 132 that is adjacent to the drive motor. A parking lever 120 is coupled to the side of the parking pin 134 that is adjacent to the drive motor. A first end of the parking lever 120 is coupled at a predetermined position to the housing 105 by a hinge.

The operation of the parking lever will be briefly explained herein below. When a second end of the parking lever 120 is pulled using a wire or the like, the parking pin 134 is pushed in the opposite direction, thus compressing the brake disks. As appreciated in the leverage principle, this is realized by a principle in which, when force is applied to one end of an action lever (the second end of the parking lever) in one direction, the opposite end of the action lever applies force in the opposite direction based on the point of application (the hinge).

As such, thanks to the parking lever provided in the braking device, a single braking device can be used both as a means for braking the vehicle when in motion and as a parking brake means.

Furthermore, coil springs (not shown) are provided at predetermined positions between the brake disks, thus minimizing heat generation by slippage between the disks, and ensuring the flow path of oil for lubrication.

As well, when it is necessary to disassemble the reduction gear system for repair or replacement of the braking device, the planetary gear assembly is removed after opening a separable portion of the housing at the drive means side. Thereafter, the drive gear and the drive shaft are removed. Then, a process of repairing or replacing the braking device can be easily conducted.

As described above, in a transmission having an integrated braking device according to the present invention, the braking device is installed in a housing at a position opposite a drive means, and a drive gear, a driven gear and a planetary gear assembly are consecutively assembled together. The housing is constructed such that it is separable at a point between the driven gear and the planetary gear assembly. Therefore, it is possible to conduct work of repairing or replacing the braking device by disassembling only parts of the reduction gear system after separating the housing, without disassembling the entire transmission, ranging from the drive means to the power transmission part (the drive motor).

Furthermore, a through hole is formed through a driven shaft, and a driven gear receiving space and a braking device receiving space communicate with each other, thus defining an oil flow path. As such, in the present invention, oil is provided around the braking device and circulates along the flow path, thereby preventing the braking device from wearing, and extending the lifetime of bearings and gears.

Although the preferred embodiment of the present invention have been disclosed for illustrative purposes, the present invention is not limited to the construction and operation of the preferred embodiment described above with reference to the drawings. Furthermore, those skilled in the art will appreciate that various modifications, additions and substitutions are possible, without departing from the scope and spirit of the invention as disclosed in the accompanying claims. Therefore, such modifications, additions and substitutions must be regarded as falling within the bounds of the present invention.

The invention claimed is:

1. A transmission having a braking device integrated with a reduction gear power transmission system, in which a drive motor is provided on a first end of a housing and drive device is provided on an opposite second end of the housing, the transmission comprising:
    an output shaft provided at a predetermined position in the housing to receive power from the drive motor;
    a drive shaft coaxially coupled to the output shaft;
    a drive gear provided at a predetermined position on the drive shaft;
    a driven gear engaging with the drive gear;
    a driven shaft coaxially coupled to the driven gear and being parallel with the drive shaft, so that power is transmitted from the drive shaft to the drive device through the driven shaft;
    the braking device coaxially coupled to an outer surface of a portion of the driven gear that faces the drive motor;
    a planetary gear assembly provided on an outer surface of the driven shaft at a position adjacent to the drive device to transmit the power at reduced speed,
    a space for receiving the driven gear communicates with a space for receiving the braking device in the housing,
    a through hole is longitudinally formed through the driven shaft,
    oil passing holes formed in the housing around respective opposite ends of the driven shaft and connected to the receiving space for the braking device, thus defining an oil flow path, and
    an oil groove, which communicates with the driven gear receiving space, may be formed at a medial position in the outer surface of the driven shaft.

2. The transmission as set forth in claim 1, further comprising:
    a needle bearing and a needle roller bearing provided on each of opposite ends of the driven shaft.

3. The transmission as set forth claim 1, further comprising:
    a ring gear engaging with the planetary gear assembly outside a radius of rotation of the planetary gear assembly and integrally coupled at a predetermined position to an inner surface of the housing.

4. The transmission as set forth claim 2, further comprising:
   a ring gear engaging with the planetary gear assembly outside a radius of rotation of the planetary gear assembly and integrally coupled at a predetermined position to an inner surface of the housing.

5. The transmission as set forth in claim 1, further comprising:
   a coupler and a parking pin coupled to the braking device at a position adjacent to the drive motor; and
   a parking lever coupled to the parking pin at a position adjacent to the drive motor and hinged at an end thereof to the first end of the housing.

6. The transmission as set forth in claim 2, further comprising:
   a coupler and a parking pin coupled to the braking device at a position adjacent to the drive motor; and
   a parking lever coupled to the parking pin at a position adjacent to the drive motor and hinged at an end thereof to the first end of the housing.

7. The transmission as set forth in claim 3, further comprising:
   a coupler and a parking pin coupled to the braking device at a position adjacent to the drive motor; and
   a parking lever coupled to the parking pin at a position adjacent to the drive motor and hinged at an end thereof to the first end of the housing.

* * * * *